United States Patent
Jo et al.

(10) Patent No.: US 9,694,746 B2
(45) Date of Patent: Jul. 4, 2017

(54) VEHICLE, CONTROL METHOD OF VEHICLE, AND VEHICLE DRIVING SOUND CONTROL APPARATUS AND METHOD

(71) Applicant: HYUNDAI MOTOR COMPANY, Seoul (KR)

(72) Inventors: Enusoo Jo, Hwaseong-si (KR); Ju In Kim, Seongnam-si (KR); Taekun Yun, Anyang-si (KR); Kyoung Jin Chang, Suwon-si (KR); Seonghyeon Kim, Anyang-si (KR); Doyoung Park, Seoul (KR); Dong Chul Park, Anyang-si (KR); Seok Gwan Hong, Gwangmyeong-si (KR); Ki Woong Jeong, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 1 day.

(21) Appl. No.: 14/834,188

(22) Filed: Aug. 24, 2015

(65) Prior Publication Data

US 2016/0144782 A1    May 26, 2016

(30) Foreign Application Priority Data

Nov. 21, 2014    (KR) .......................... 10-2014-0163289

(51) Int. Cl.
| | | |
|---|---|---|
| *B60Q 9/00* | (2006.01) | |
| *H04R 3/00* | (2006.01) | |
| *G10H 1/08* | (2006.01) | |

(52) U.S. Cl.
CPC ................. *B60Q 9/00* (2013.01); *G10H 1/08* (2013.01); *H04R 3/00* (2013.01);
(Continued)

(58) Field of Classification Search
CPC ........ B60Q 9/00; H04R 3/00; H04R 2430/01; G10H 1/08; G10H 2250/381;
(Continued)

(56) References Cited

U.S. PATENT DOCUMENTS

| | | | | |
|---|---|---|---|---|
| 5,635,903 A | * | 6/1997 | Koike ..................... | A63H 17/34 340/384.1 |
| 7,979,147 B1 | * | 7/2011 | Dunn ...................... | G10K 15/02 181/192 |

(Continued)

FOREIGN PATENT DOCUMENTS

| | | | | |
|---|---|---|---|---|
| GB | 2476470 A | * | 6/2011 | ............... G10H 1/02 |
| JP | 7-182587 A | | 7/1995 | |

(Continued)

OTHER PUBLICATIONS

Office Action with Korean Patent Application No. 119980045675 dated Nov. 2, 2015 with English translation.

(Continued)

*Primary Examiner* — Brenda Bernardi
(74) *Attorney, Agent, or Firm* — McDermott Will & Emery LLP

(57) ABSTRACT

A user may freely generate a vehicle driving sound using a mounted mobile terminal so as to generate various types of driving sounds through a speaker. A vehicle includes a setting unit configured to set response characteristics of a vehicle driving sound for at least one of a plurality of pieces of vehicle state information and set a section-specific volume of the vehicle driving sound for at least one of a plurality of set response characteristics including revolutions per minute (RPM) and a controller configured to control an output of the vehicle driving sound generated according to a setting of the setting unit and control sound (Continued)

transfer characteristics unique to the vehicle to be reflected when the vehicle driving sound is generated and output.

14 Claims, 12 Drawing Sheets

(52) U.S. Cl.
CPC . *G10H 2210/301* (2013.01); *G10H 2220/116* (2013.01); *G10H 2220/351* (2013.01); *G10H 2250/381* (2013.01); *H04R 2430/01* (2013.01)

(58) Field of Classification Search
CPC ....... G10H 2220/351; G10H 2210/301; G10H 2220/116
See application file for complete search history.

(56) References Cited

U.S. PATENT DOCUMENTS

| | | | | |
|---|---|---|---|---|
| 8,155,343 | B2* | 4/2012 | Honji | G10K 15/04 381/61 |
| 8,620,001 | B2* | 12/2013 | Peachey | B60Q 5/00 381/61 |
| 2010/0329488 | A1* | 12/2010 | Holub | H04R 27/00 381/301 |
| 2014/0016792 | A1* | 1/2014 | Christoph | G10L 19/06 381/61 |
| 2015/0124989 | A1* | 5/2015 | Park | G10K 11/178 381/71.4 |

FOREIGN PATENT DOCUMENTS

| | | | |
|---|---|---|---|
| JP | 2000-10576 | A | 1/2000 |
| JP | 2013-218079 | A | 10/2013 |
| JP | 2013218079 | A * | 10/2013 |
| KR | 10-2004-0010472 | A | 1/2001 |
| KR | 10-2013-0079872 | A | 7/2013 |
| KR | 10-1398202 | B1 | 5/2014 |
| WO | 2012/016722 | A2 | 2/2012 |

OTHER PUBLICATIONS

Decision to Grant Korean Patent Application No. 10-2014-0163289 dated Jun. 9, 2016 with partial English translation.

* cited by examiner

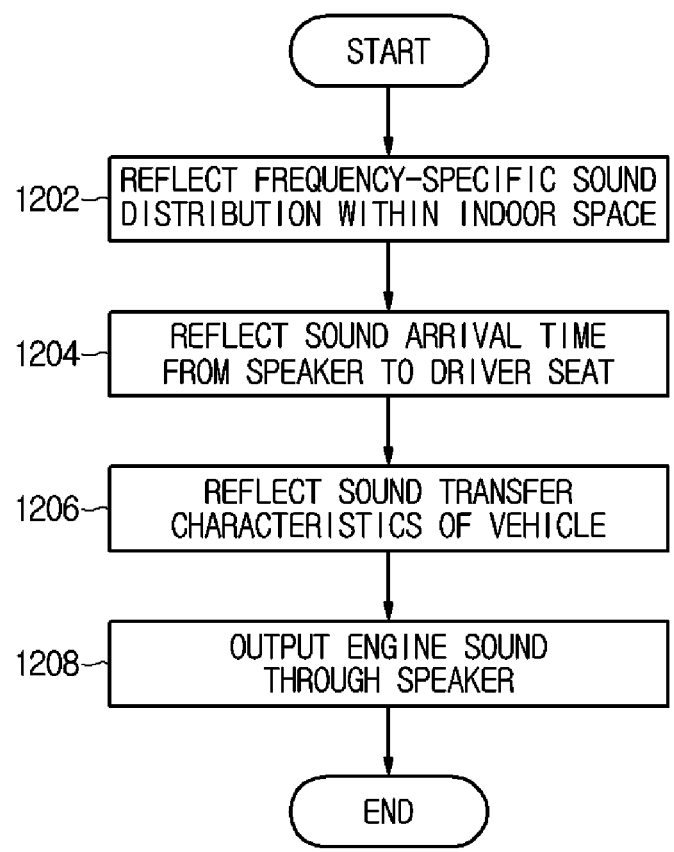

VEHICLE, CONTROL METHOD OF VEHICLE, AND VEHICLE DRIVING SOUND CONTROL APPARATUS AND METHOD

CROSS-REFERENCE TO RELATED APPLICATION

This application claims the benefit of Korean Patent Application No. 10-2014-163289, filed on Nov. 21, 2014 in the Korean Intellectual Property Office, the disclosure of which is incorporated herein by reference.

BACKGROUND

1. Field

The present disclosure relates to a vehicle, and more particularly, to a vehicle driving sound control apparatus.

2. Description of the Related Art

Noise of a vehicle degrades a driver's ability of concentration and is considered as an obstacle that contributes to an uncomfortable indoor environment. However, the noise of the vehicle is an important element from which a dynamic property of the vehicle can be felt by the driver and provides emotional satisfaction to the driver so as to allow the driver to feel propulsion and maneuverability in his or her body.

Accordingly, for example, devices for artificially generating and providing proper vehicle noise according to preference and taste of the driver have been developed and proposed with the development of electric vehicles in which noise and vibration are substantially absent. Some enthusiasts spend a great deal of time and money in implementing an engine sound unique to a specific vehicle type or model in their own vehicles and make considerable effort to create a particularly preferred tone.

SUMMARY

Therefore, it is an aspect of the present invention to allow a user to freely generate a vehicle driving sound using an audio/video/navigation (AVN) system or a mobile terminal mounted within a vehicle and output various types of driving sounds through a speaker.

Additional aspects of the invention will be set forth in part in the description which follows and, in part, will be obvious from the description, or may be learned by practice of the invention.

In accordance with one aspect of the present invention, a vehicle includes: a setting unit configured to set response characteristics of a vehicle driving sound for at least one of a plurality of pieces of vehicle state information and set a section-specific volume of the vehicle driving sound for at least one of a plurality of set response characteristics including revolutions per minute (RPM); and a controller configured to control an output of the vehicle driving sound generated according to a setting of the setting unit and control sound transfer characteristics unique to the vehicle to be reflected when the vehicle driving sound is generated and output.

In the vehicle, the plurality of pieces of vehicle state information may include at least one of accelerator pedal sensitivity, torque, a speed, and a transmission gear stage of the vehicle.

In the vehicle, the setting of the section-specific volume of the vehicle driving sound may include setting a volume of a target driving sound through adding and offsetting for an actual engine sound according to each section.

In the vehicle, the sound transfer characteristics unique to the vehicle may be characteristics of a sound-specific frequency distribution of an internal space of the vehicle.

In the vehicle, the sound transfer characteristics unique to the vehicle may be characteristics of a driving sound transfer time according to a plurality of positions within a boarding space and a relative position of a speaker from which the vehicle driving sound is output.

In the vehicle, the sound transfer characteristics unique to the vehicle may be synchronization characteristics of an output timing of each of a plurality of speakers from which the vehicle driving sound is output.

In the vehicle, the setting unit may be at least one of a head unit and a mobile terminal.

In accordance with another aspect of the present invention, a control method of a vehicle includes: setting response characteristics of a vehicle driving sound for at least one of a plurality of pieces of vehicle state information; setting a section-specific volume of the vehicle driving sound for at least one of a plurality of set response characteristics including RPM; and controlling an output of the vehicle driving sound generated according to the setting of a setting unit and controlling sound transfer characteristics unique to the vehicle to be reflected when the vehicle driving sound is generated and output.

In the control method of the vehicle, the plurality of pieces of vehicle state information may include at least one of accelerator pedal sensitivity, torque, a speed, and a transmission gear stage.

In the control method of the vehicle, the setting of the section-specific volume of the vehicle driving sound may include setting a volume of a target driving sound through adding and offsetting for an actual engine sound according to each section.

In the control method of the vehicle, the sound transfer characteristics unique to the vehicle may be characteristics of a sound-specific frequency distribution of an internal space of the vehicle.

In the control method of the vehicle, the sound transfer characteristics unique to the vehicle may be characteristics of a driving sound transfer time according to a plurality of positions within a boarding space and a relative position of a speaker from which the vehicle driving sound is output.

In the control method of the vehicle, the sound transfer characteristics unique to the vehicle may be synchronization characteristics of an output timing of each of a plurality of speakers from which the vehicle driving sound is output.

In the control method of the vehicle, the setting unit may be at least one of a head unit and a mobile terminal.

In accordance with still another aspect of the present invention, a vehicle driving sound control apparatus includes: a setting unit configured to set response characteristics of a vehicle driving sound for at least one of a plurality of pieces of vehicle state information and set a section-specific volume of the vehicle driving sound for at least one of a plurality of set response characteristics including RPM; and a controller configured to control an output of the vehicle driving sound generated according to a setting of the setting unit and control sound transfer characteristics unique to the vehicle to be reflected when the vehicle driving sound is generated and output.

In accordance with still another aspect of the present invention, a vehicle driving sound control method includes: setting response characteristics of a vehicle driving sound for at least one of a plurality of pieces of vehicle state information; setting a section-specific volume of the vehicle driving sound for at least one of a plurality of set response characteristics including RPM; and controlling an output of the vehicle driving sound generated according to the setting of a setting unit and controlling sound transfer characteristics unique to the vehicle to be reflected when the vehicle driving sound is generated and output.

In accordance with still another aspect of the present invention, a vehicle includes: a setting unit configured to set response characteristics of a vehicle driving sound for at least one of a plurality of pieces of vehicle state information including accelerator pedal sensitivity, torque, a speed, and a transmission gear stage of the vehicle and set a section-specific volume of the vehicle driving sound for at least one of a plurality of set response characteristics including RPM; and a controller configured to control an output of the vehicle driving sound generated according to a setting of the setting unit and control sound transfer characteristics unique to the vehicle to be reflected when the vehicle driving sound is generated and output.

According to the above-described aspects, it is possible to allow a user to freely generate a vehicle driving sound using a mobile terminal and output various types of driving sounds through a speaker.

BRIEF DESCRIPTION OF THE DRAWINGS

These and/or other aspects of the invention will become apparent and more readily appreciated from the following description of the embodiments, taken in conjunction with the accompanying drawings of which:

FIG. 12 is a diagram illustrating a vehicle driving sound control method according to another exemplary embodiment of the present invention.

DETAILED DESCRIPTION

Figure 1:
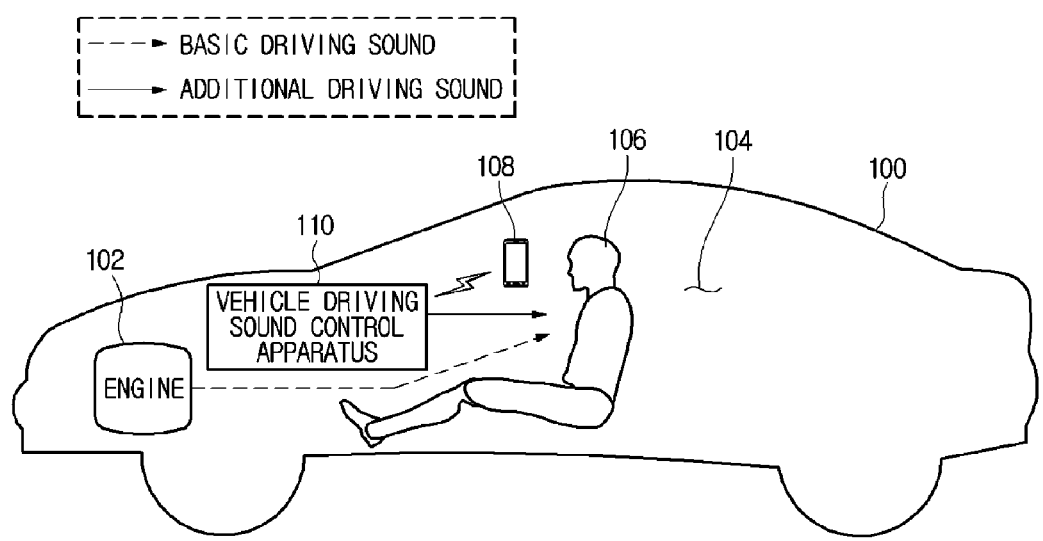
FIG. 1 is a diagram illustrating a concept of a vehicle driving sound control apparatus according to an exemplary embodiment of the present invention.

Reference will now be made in detail to the embodiments of the present invention, examples of which are illustrated in the accompanying drawings, wherein like reference numerals refer to like elements throughout.

FIG. 1 is a diagram illustrating a concept of a vehicle driving sound control apparatus according to an exemplary embodiment of the present invention. As illustrated in FIG. 1, an engine 102 for generating power is mounted in a vehicle 100. When the vehicle 100 is being driven, an engine sound is generated by the engine 102 and the engine sound flows into a passenger compartment 104, which is a boarding space. In this manner, when the engine sound basically generated from the engine 102 of the vehicle in operation is a basic driving sound, the basic driving sound of the engine 102 may not suit a preference of a user (driver) 106.

In the exemplary embodiment of the present invention, the user 106 may specifically set vehicle driving sound parameters (for example, parameters for generating a desired vehicle driving sound) desired by the user 106 through an application installed in a mobile terminal 108. Based on the vehicle driving sound parameters set as described above, a vehicle driving sound control apparatus 110 causes a desired vehicle driving sound to be generated. A sound transferred to the passenger compartment 104 may be a mixture of a basic driving sound generated from the engine 102 and an additional driving sound generated from the vehicle driving sound control apparatus 110. The vehicle driving sound to be mentioned in the following description may refer to an additional driving sound additionally generated through the vehicle driving sound control apparatus 110.

In FIG. 1, an operation for operating the mobile terminal 108 to set the vehicle driving sound parameters need not always be performed inside the vehicle 100. It is possible to set the vehicle driving sound parameters through an operation of an audio/video/navigation (AVN) system or the mobile terminal 108 even in a state in which the user 106 is located outside the vehicle 100. For this, the AVN system or the mobile terminal 108 and the vehicle driving sound control apparatus 110 mounted within the vehicle are not limited to a wired-connection-based communication scheme but may perform communication using at least one of a plurality of communication schemes including wireless communication schemes such as mobile communication, a wireless local area network (LAN), and near field communication and a Universal Serial Bus (USB) type wired communication scheme. For example, the AVN system or the mobile terminal 108 and the vehicle driving sound control apparatus 110 mounted within the vehicle may perform communication using at least one of a plurality of communication schemes including mobile communications such as second generation (2G), third generation (3G), and Long Term Evolution (LTE) communications, a wireless LAN such as wireless fidelity (Wi-Fi), near field communication such as Bluetooth, wired communication of a USB scheme, and wired communication through a connection of a communication cable. Here, the mobile terminal 108 may be a mobile communication terminal (for example, a smartphone), a tablet computer, a tablet personal computer (PC), a web pad, a notebook computer, or the like.

Figure 2:
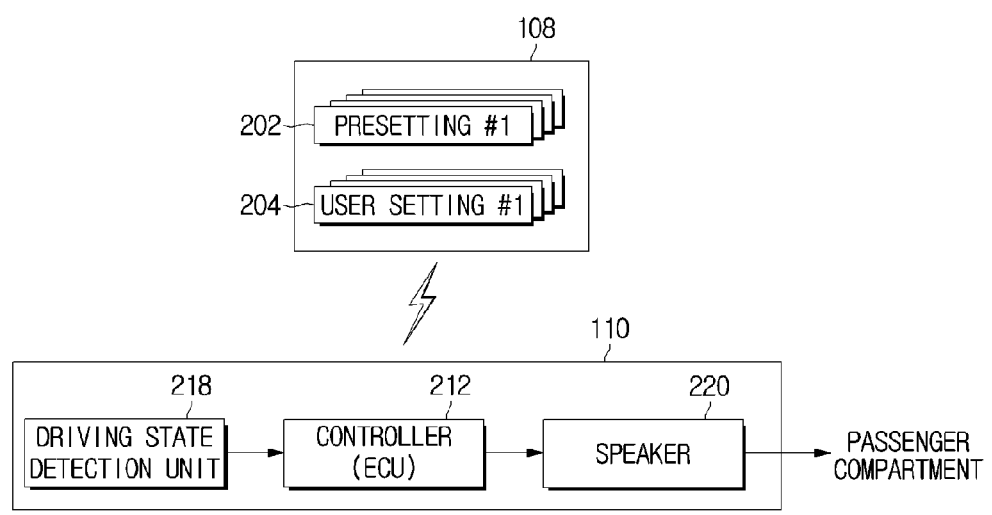
FIG. 2 is a diagram illustrating a control system of the vehicle driving sound control apparatus illustrated in FIG. 1.

FIG. 2 is a diagram illustrating a control system of the vehicle driving sound control apparatus illustrated in FIG. 1. As illustrated in FIG. 2, there are at least two methods, including presetting 202 and user setting 204, to set a desired vehicle driving sound parameter through an application installed in the mobile terminal 108 so as to set vehicle driving sound parameters in the exemplary embodiment of the present invention. For this, the application of the mobile terminal 108 provides a user interface (for example, a graphic user interface) for enabling a desired vehicle driving sound parameter to be set through at least the two methods of the presetting 202 and the user setting 204. As described above, by installing the application in the AVN system rather than the mobile terminal 108, it is also possible to set the desired vehicle driving sound parameter through the application to be executed in the AVN system.

The presetting 202 is presetting of a vehicle driving sound parameter of a specific type by a manufacturer of the vehicle 100. Alternatively, the user 106 may cause the vehicle driving sound satisfying the vehicle driving sound parameter of the presetting 202 to be generated by merely selecting the desired presetting 202 through the application of the mobile terminal 108.

The user setting 204 enables the user to directly set at least one vehicle driving sound parameter to a desired value. The user 106 sets at least one vehicle driving sound parameter to a desired value through the application of the mobile terminal 108, thereby causing a type of vehicle driving sound desired by the user 106 to be generated.

When a type of vehicle driving sound parameter desired by the user 106 is set through the presetting 202 or the user setting 204 in the mobile terminal 108, the mobile terminal 108 transmits the set vehicle driving sound parameter to a controller 212 of the vehicle driving sound control apparatus 110 through communication.

In the exemplary embodiment of the present invention, the controller 212 receives the vehicle driving sound parameter transmitted from the mobile terminal 108, generates a signal corresponding to the vehicle driving sound while reflecting the received vehicle driving sound parameter, and drives a speaker 220 after the signal is amplified, thereby causing the vehicle driving sound to be transferred to the inside of the passenger compartment 104.

When the user 106 sets the vehicle driving sound parameter through the application of the mobile terminal 108, the controller 212 drives the speaker 220 while reflecting the set vehicle driving sound parameter. At this time, a type of vehicle driving sound suitable for an operation state of the vehicle 100 is configured to be generated simultaneously, while the vehicle driving sound parameter set by the user 106 is satisfied by determining the driving state (or driving condition) of the vehicle 100 through the driving state detection unit 218 and controlling a driving degree of the speaker 220 in consideration of the driving state of the vehicle 100. The driving state detection unit 218 includes a plurality of sensors for detecting operation states of various constituent elements of the vehicle 100 at various positions of the vehicle 100. Operation state information of various constituent elements of the vehicle 100 detected by the plurality of sensors of the driving state detection unit 218 is transmitted to the controller 212. The controller 212 determines a driving state (or driving condition) of the vehicle 100 through the operation state information.

A process of setting the vehicle driving sound parameters through the plurality of sensors of the driving state detection unit 218 and the application in the mobile terminal 108 mentioned in FIG. 2 and an output process through the speaker 220 will be more specifically described below with reference to FIGS. 3 to 5.

Figure 3:
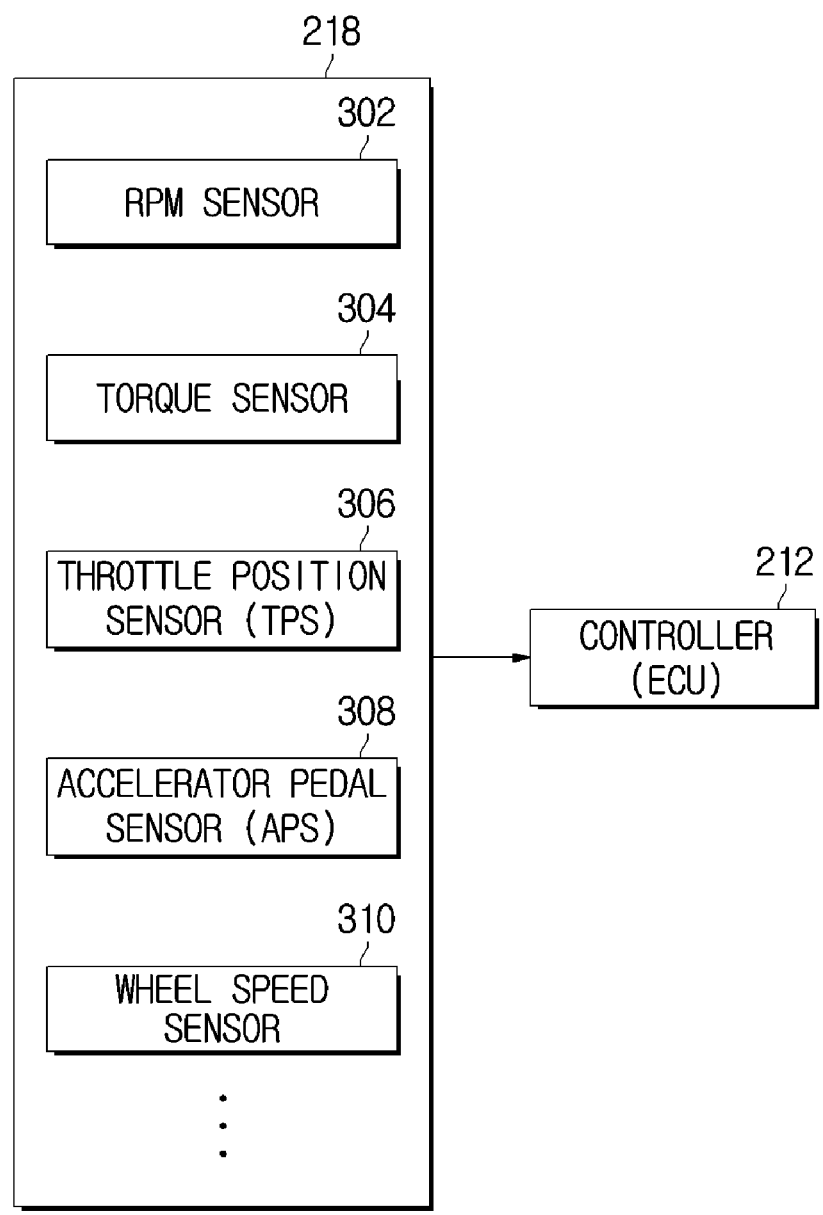
FIG. 3 is a diagram illustrating a configuration of a driving state detection unit illustrated in FIG. 2.

FIG. 3 is a diagram illustrating a configuration of the driving state detection unit illustrated in FIG. 2. As illustrated in FIG. 3, the driving state detection unit 218 may include an RPM (revolutions per minute) sensor 302, a torque sensor 304, a throttle position sensor 306, an accelerator position sensor 308, and a wheel speed sensor 310.

The RPM sensor 302 is used to detect the RPM of the engine 102, and generates pulses equal in number to cylinders of the engine 102 for every revolution. For example, as output pulses of the RPM sensor 302, four pulses per revolution are generated in the case of a four-cylinder engine, six pulses per revolution are generated in the case of a six-cylinder engine, and three pulses per revolution are generated in the case of a three-cylinder engine. The controller 212 determines the number of revolutions of the engine 102 using the number of pulses per minute generated by the RPM sensor.

The torque sensor 304 is used to detect the torque of the engine 102. It is possible to determine a load degree of the engine 102 through the torque sensor 304.

The throttle position sensor 306 is used to detect an opening degree of a throttle valve according to an operation (acceleration) of an accelerator pedal by the driver. The throttle position sensor 306 serves as a variable resistance element which revolves with a throttle shaft of a throttle body and detects the opening degree of the throttle valve. According to the revolution of the throttle valve, a resistance value of the throttle position sensor 306 is variable according to the revolution of the throttle valve and therefore an output voltage of the throttle position sensor 306 changes. The controller 212 determines the opening degree of the throttle valve using the change in the output voltage. The controller 212 controls a fuel injection quantity or the like by determining an operation mode of the engine 102 from information such as the output voltage (that is, the opening degree of the throttle valve) and the number of revolutions of the engine. In addition, the controller 212 enables a vehicle driving sound suitable for the operation mode of the engine 102 to be generated by determining a driving control value of a speaker 220 according to the opening degree of the throttle valve.

The accelerator pedal sensor 308 is used to detect an operation quantity of an accelerator pedal. That is, if the operation quantity is assumed to be 0% when the accelerator pedal is not depressed and the operation quantity is assumed to be 100% when the accelerator pedal is maximally depressed, the operation degree of the accelerator pedal by the user 106 is recognized as a value between 0% and 100%. The accelerator pedal sensor 308 includes one set of two sensors in which one sensor is used to detect an operation quantity of the accelerator pedal and the other sensor is used to detect (monitor) a defect.

The wheel speed sensor 310 is used to measure a speed of the vehicle, that is, a vehicle speed, by detecting a wheel revolution speed of the vehicle 100.

In this manner, the controller 212 receives a detected value transmitted from the RPM sensor 302, the torque sensor 304, the throttle position sensor 306, the accelerator pedal sensor 308, the wheel speed sensor 310, or the like of the driving state detection unit 218 and monitors driving information of the vehicle 100. The driving state detection unit 218 may further include other sensors in addition to the RPM sensor 302, the torque sensor 304, the throttle position sensor 306, the accelerator pedal sensor 308, and the wheel speed sensor 310.

Figure 4:
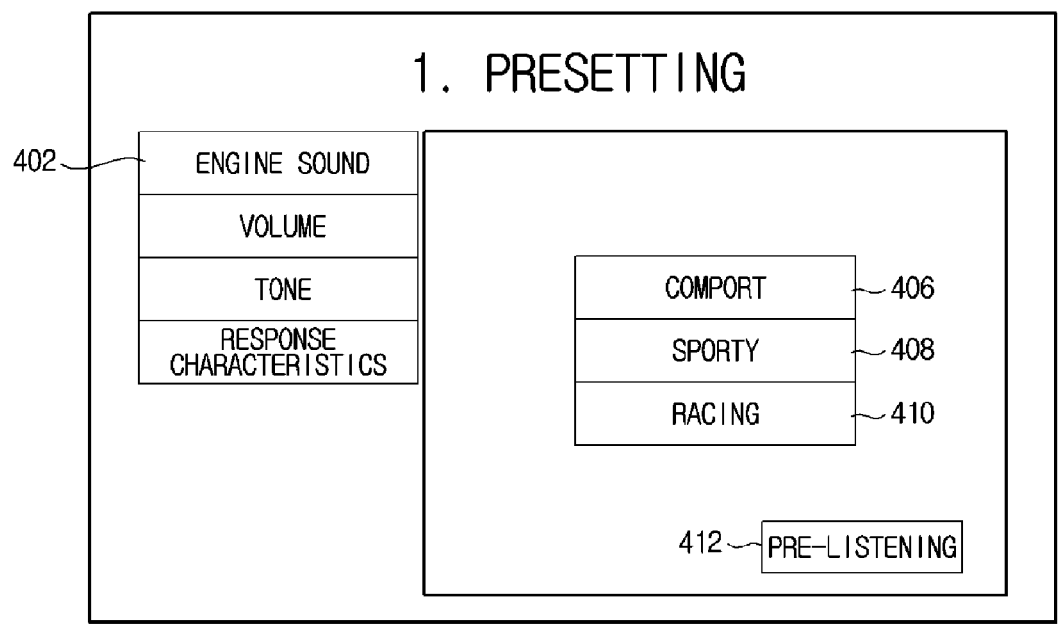
FIG. 4 is a diagram illustrating a presetting screen of a vehicle driving sound parameter through an application of a mobile terminal illustrated in FIG. 1.

FIG. 4 is a diagram illustrating a presetting screen of a vehicle driving sound parameter through an application of a mobile terminal illustrated in FIG. 1. The presetting screen illustrated in FIG. 4 is a screen when a display of the mobile terminal 108 is assumed to be a touch type display, and may be configured to be operated using a cursor and a direction key when the display of the mobile terminal 108 is not the touch type display.

As illustrated in FIG. 4, the presetting screen displayed on the touch type display of the mobile terminal 108 may be displayed by touching an item of an engine sound 402 on the left of the screen. When the user 106 touches the item of the engine sound 402 on the screen displayed on the display of the mobile terminal 108, various types of vehicle driving sounds preset on the right thereof are displayed. In FIG. 4, the case in which three types of vehicle driving sounds such as COMFORT 406, SPORTY 408, and RACING 410 may be selected is illustrated. In addition, various types of preset vehicle driving sounds may be configured to be selectable. COMFORT 406 represents a vehicle driving sound capable of being generated in a comfort driving pattern, and is used to generate a silent type vehicle driving sound without speed sensing in consideration of relatively frequent speed changes. SPORTY 408 represents a vehicle driving sound in a relatively sportier driving pattern than COMFORT 406 and is used to generate the vehicle driving sound in a region of relatively high engine RPM. RACING 410 represents a vehicle driving sound in a very dynamic and extreme driving pattern, and is used to generate the vehicle driving sound in a region of very high RPM in the vicinity of a red zone as if the vehicle 100 were being driven on a racing track.

The user 106 enables a vehicle driving sound of a corresponding item to be generated by touching and selecting a desired item among COMFORT 406, SPORTY 408, and RACING 410. When the user 106 selects the desired item from COMFORT 406, SPORTY 408, and RACING 410, the mobile terminal 108 enables a corresponding vehicle driving sound to be generated by transmitting a vehicle driving sound parameter of a corresponding item to the controller 212 of the vehicle 100.

In the screen displayed on the display of the mobile terminal 108, an item of pre-listening 412 is used to enable the user 106 to recognize a corresponding type of vehicle driving sound in advance by generating a vehicle driving sound corresponding to an item set by the user 106 among COMFORT 406, SPORTY 408, and RACING 410 for a short time, for example, about 3 to 5 seconds. The vehicle driving sound generated for the pre-listening 412 can be output through the speaker 220 of the vehicle 100 or the speaker of the mobile terminal 108. Accordingly, because the user 106 need not be aware of a profile provided for each of the items of COMFORT 406, SPORTY 408, and RACING 410, but may enable a corresponding vehicle driving sound to be generated by merely selecting an item corresponding to a type of sound that the user 106 desires after listening to a pre-listening sound that is reproduced, the pre-listening 412 is very convenient.

Figure 5A:
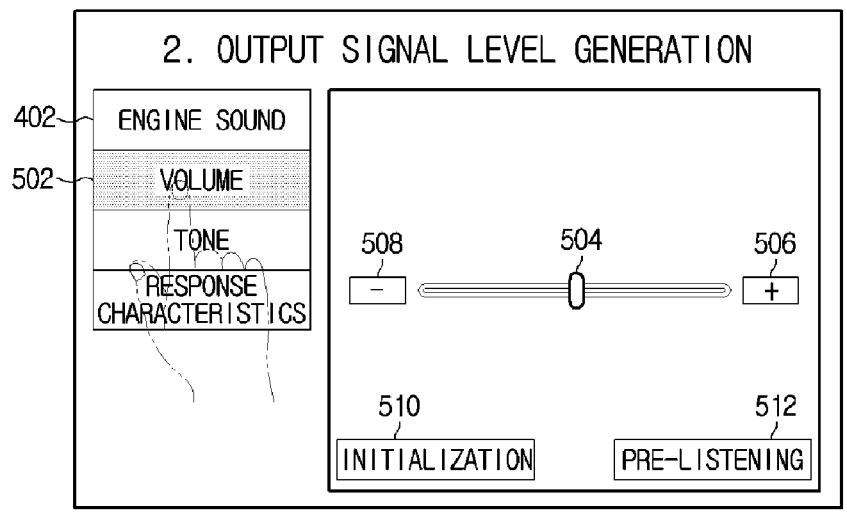
FIGS. 5A to 5C are diagrams illustrating the user setting of vehicle driving sound parameters through the application of the mobile terminal illustrated in FIG. 1.
Figure 5B:
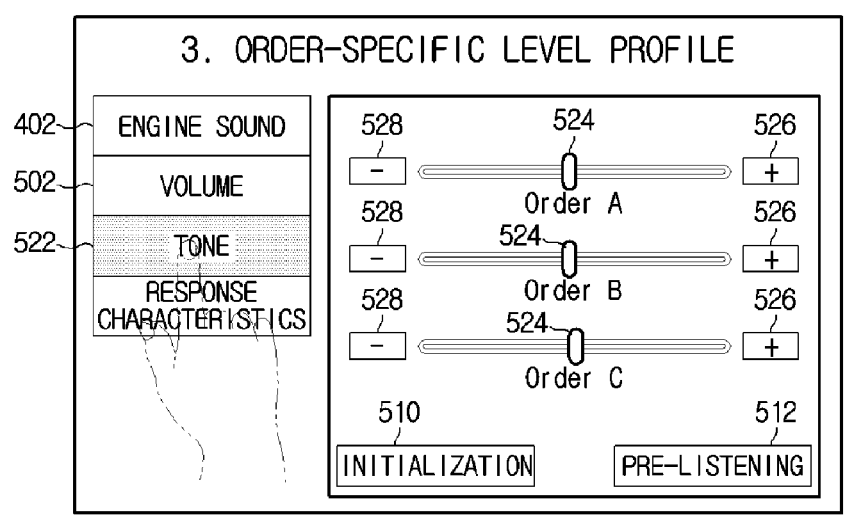
Figure 5C:
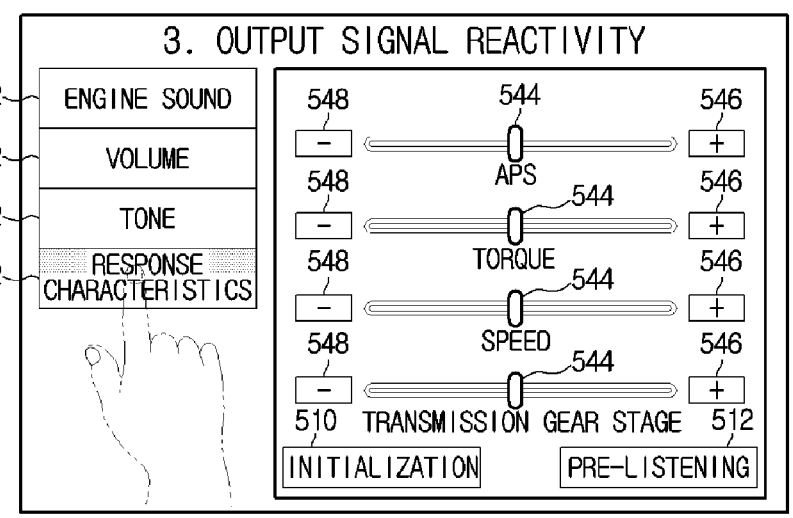

FIGS. 5A to 5C are diagrams illustrating the user setting of vehicle driving sound parameters through the application of the mobile terminal illustrated in FIG. 1. In an application for vehicle driving sound control according to the exemplary embodiment of the present invention, the user is allowed to directly adjust a volume and a tone of a desired vehicle driving sound and response characteristics.

First, as illustrated in FIG. 5A, an output signal level generation screen displayed on the touch type display of the mobile terminal 108 may be displayed by touching an item of a volume 502 of the left of the screen. When the user 106 touches the item of the volume 502 on the screen displayed on the display of the mobile terminal 108, a slide bar 504 through which the volume may be adjusted is displayed on the right thereof. When the user 106 drags the slide bar 504 in a direction of a (+) indication 506, the volume of the vehicle driving sound increases. In contrast, when the user 106 drags the slide bar 504 in a direction of a (−) indication 508, the volume of the vehicle driving sound decreases.

Volume settings may be classified into <master volume>, <torque-adjusted volume>, and <speed-adjusted volume>. The user 106 uses <master volume> to set the volume of the vehicle driving sound to his/her desired volume. Here, the volume of the vehicle driving sound is determined according to a setting value from the user. <torque-adjusted volume> is used to increase or decrease the volume of the vehicle driving sound according to the torque generated by the engine 102 of the vehicle 100. When the user sets <torque-adjusted volume> to a low volume, a volume change amount is maintained to be relatively low compared to a torque change amount. In contrast, when the user sets <torque-adjusted volume> to a high volume, the volume is largely changed even with a small torque change. A more dynamic vehicle driving sound may be provided even with the small torque change through the setting of <torque-adjusted volume> as described above. <speed-adjusted volume> is used to increase or decrease the volume of the vehicle driving sound according to a driving speed of the vehicle 100. When the user sets <speed-adjusted volume> to a low volume, a volume change amount is maintained to be relatively low compared to a speed change amount. In contrast, when the user sets <speed-adjusted volume> to a high volume, the volume is largely changed even with a small speed change. It is possible to provide a more dynamic vehicle driving sound even at the time of relatively smooth acceleration through the setting of <speed-adjusted volume> as described above The setting of the volume is not limited to the above-described three settings, and it is possible to set the volume in consideration of other characteristics. For example, the volume may be set to be adjusted based on the RPM of the engine 102 instead of the vehicle speed. In addition, the volume may be set according to sections of the vehicle speed or RPM. For example, the volume may be classified based on the RPM into a plurality of sections including a section of 2000 RPM or less, a section of 2001 to 4000 RPM, and a section of 4001 RPM or more, and the user may independently set an RPM-section-specific volume.

Initialization 510 is used to return the slide bar 504 to a state of an initial value (for example, an intermediate value). In FIG. 5A, the item of the pre-listening 512 is used to enable the user 106 to recognize a volume of a vehicle driving sound in advance by generating a vehicle driving sound corresponding to the volume currently set by the user 106 for a short time, for example, about 3 to 5 seconds. The vehicle driving sound generated for the pre-listening 512 may be output through the speaker 220 of the vehicle 100 or the speaker of the mobile terminal 108. Accordingly, because the user 106 may pre-check the volume of a vehicle driving sound that he or she has selected, the pre-listening 512 is very convenient.

As illustrated in FIG. 5B, an order-specific level profile screen displayed on the touch type display of the mobile terminal 108 may be displayed by touching an item of a tone 522 of the left of the screen. When the user 106 touches the item of the tone 522 on the screen displayed on the display of the mobile terminal 108, a plurality of slide bars 524 through which order-specific levels of the engine sound may be separately adjusted are displayed on the right of the screen. When the user 106 drags the slide bar 524 of a specific order in a direction of a (+) indication 526, a level of the vehicle driving sound in a corresponding order increases. In contrast, when the user 106 drags the slide bar 524 of the specific order in a direction of a (−) indication 528, the level of the vehicle driving sound in the corresponding order decreases. In this manner, it is possible to generate vehicle driving sounds of various tones rather than a fixed tone by separately adjusting each order-specific level of the engine sound. Initialization 530 is used to return each order-specific slide bar 524 to a state of an initial value (for example, an intermediate value). In FIG. 5B, the item of pre-listening 532 is used to enable the user 106 to recognize the tone of a corresponding vehicle driving sound in advance by generating the vehicle driving sound reflecting all current order-specific levels set by the user 106 for a short time, for example, about 3 to 5 seconds. The vehicle driving sound generated for the pre-listening 532 may be output through the speaker 220 of the vehicle 100 or the speaker of the mobile terminal 108. Accordingly, because the user 106 may pre-check the volume of a vehicle driving sound that he or she has selected, the pre-listening 532 is very convenient.

As illustrated in FIG. 5C, an output signal reactivity screen displayed on the touch type display of the mobile terminal 108 may be displayed by touching an item of response characteristics 542 of the left of the screen. When the user 106 touches the item of the response characteristics 542 on the screen displayed on the display of the mobile terminal 108, a plurality of slide bars 544 through which response characteristics (for example, a gain) of the vehicle driving sound for accelerator pedal sensitivity (APS), torque, a speed, a transmission gear stage, and the like may be separately set are displayed on the right of the screen. When the user 106 operates, for example, a slide bar for setting response characteristics of the APS among the plurality of slide bars 544 illustrated in FIG. 5C, response characteristics for the operation of the accelerator pedal are determined according to a value set by the operation of the slide bar. For example, when the slide bar moves closer to 0%, a relatively faster response is obtained in a relatively early operation step. When the slide bar moves closer to 100%, a relatively faster response is obtained in a relatively later operation step of the accelerator pedal. Likewise, a vehicle driving sound in consideration of response characteristics set for the APS, the torque, the speed, the transmission gear stage, and the like may be generated when the vehicle is actually driven by separately setting the response characteristics for the torque of the engine 102, the vehicle speed, the transmission gear stage, and the like. In FIG. 5C, an item of pre-listening 552 is used to enable the user 106 to recognize the reactivity of a corresponding vehicle driving sound in advance by generating the vehicle driving sound reflecting current output signal reactivity set by the user 106 for a short time, for example, about 3 to 5 seconds. For this, the user 106 may cause a virtual vehicle driving sound to be generated so that he or she may know the reactivity of the output signal every time the accelerator pedal of the vehicle 100 is directly operated or a virtual accelerator pedal is operated in a touch scheme by implementing the virtual accelerator pedal on the screen of the application of the mobile terminal 108. The vehicle driving sound generated for the pre-listening 552 may be output through the speaker 220 of the vehicle 100 or the speaker of the mobile terminal 108. Accordingly, because the user 106 may pre-check the vehicle driving sound reflecting his or her setting, the pre-listening 552 is very convenient.

Figure 6:
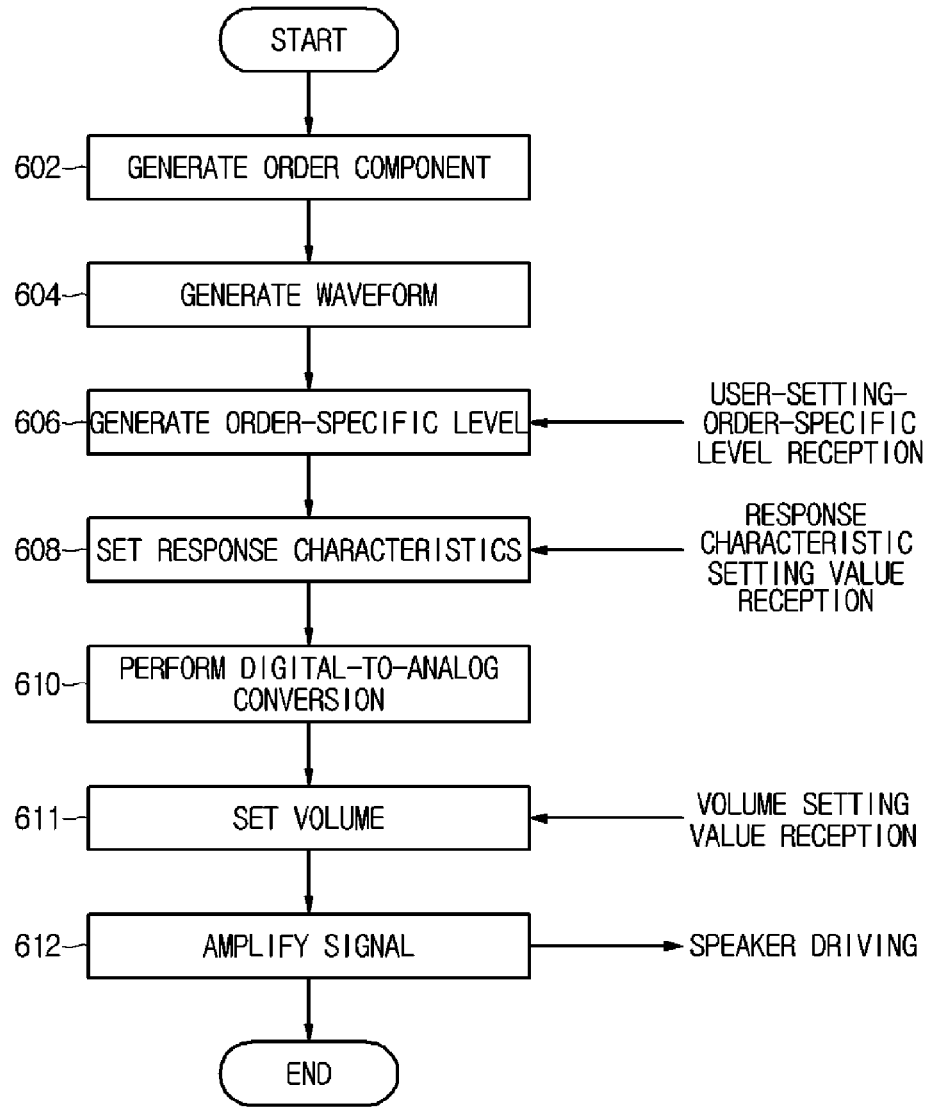
FIG. 6 is a diagram illustrating a process of generating a control signal for driving a speaker.

FIG. 6 is a diagram illustrating a vehicle driving sound control method according to still another exemplary embodiment of the present invention. As illustrated in FIG. 6, the controller 212 generates a control signal for generating the vehicle driving sound through a series of processes such as <order component generation 602>, <waveform generation 604>, <order-specific level generation 606>, <response characteristic setting 608>, <digital-to-analog conversion 610>, <volume setting 611>, <signal amplification 612>, and the like.

In the step of <order component generation 602>, order components of harmonic signals of various orders are generated according to the RPM of the engine 102. In the step of <waveform generation 604>, a current waveform of an order-target-value-specific output signal is generated in consideration of a vehicle transfer function and an order target value according to the vehicle transfer function.

In the step of <order-specific level generation 606>, an order-specific level value is generated by applying the order-specific level profile previously set by the user in FIG. 5B. In the step of <response characteristic setting 608>, a gain of the vehicle driving sound is determined by applying the response characteristics previously set by the user in FIG. 5C. In the step of <digital-to-analog conversion 610>, digital-to-analog conversion for converting a digital control value generated in steps 602 to 608 in the form of an analog signal for actually driving the speaker 220 is performed. In the step of <volume setting 611>, a volume (that is, a magnitude of sound while the vehicle is being driven) is determined according to the user settings of <master volume>, <torque-adjusted volume>, and <speed-adjusted volume> as described above with reference to FIG. 5A. In this manner, because a signal converted in the analog form is not sufficiently large to drive the speaker 220, the speaker 220 is driven by amplifying the signal through <signal amplification 612>. In the step of <signal amplification 612>, a volume setting value determined in the step of <volume setting 611> is reflected.

Figure 7:
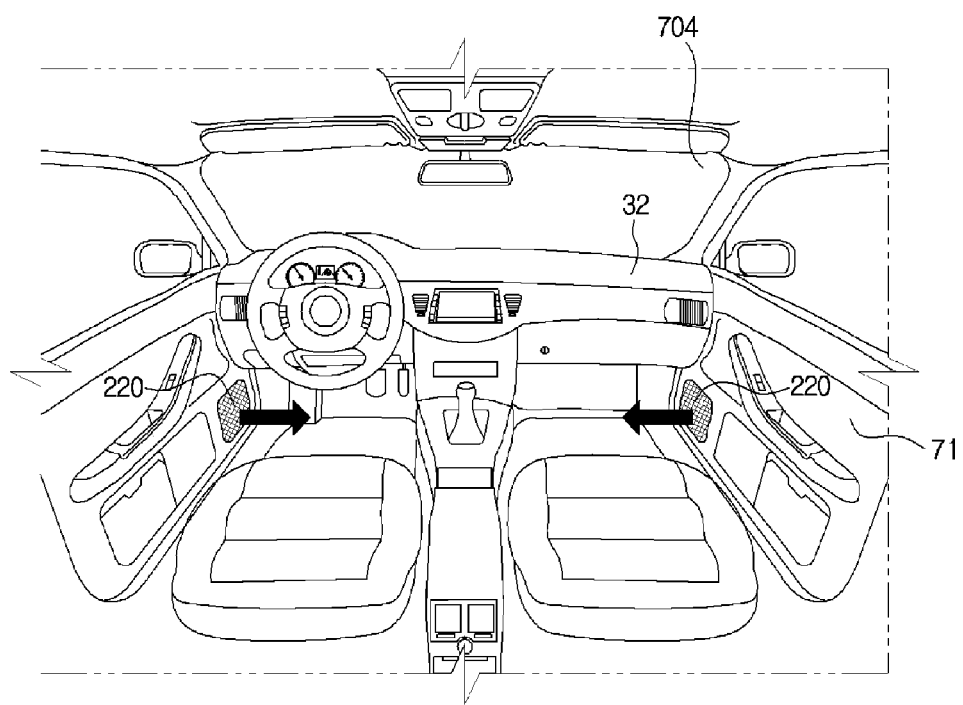
FIG. 7 is a diagram illustrating an interior of a vehicle according to an exemplary embodiment of the present invention.

FIG. 7 is a diagram illustrating an interior of a vehicle according to an exemplary embodiment of the present invention. As illustrated in FIG. 7, the vehicle driving sound is output through the speaker 220 in the exemplary embodiment of the present invention. An output of the vehicle driving sound through the speaker 220 is configured so that more various types of vehicle driving sounds may be generated and output.

Figure 8:
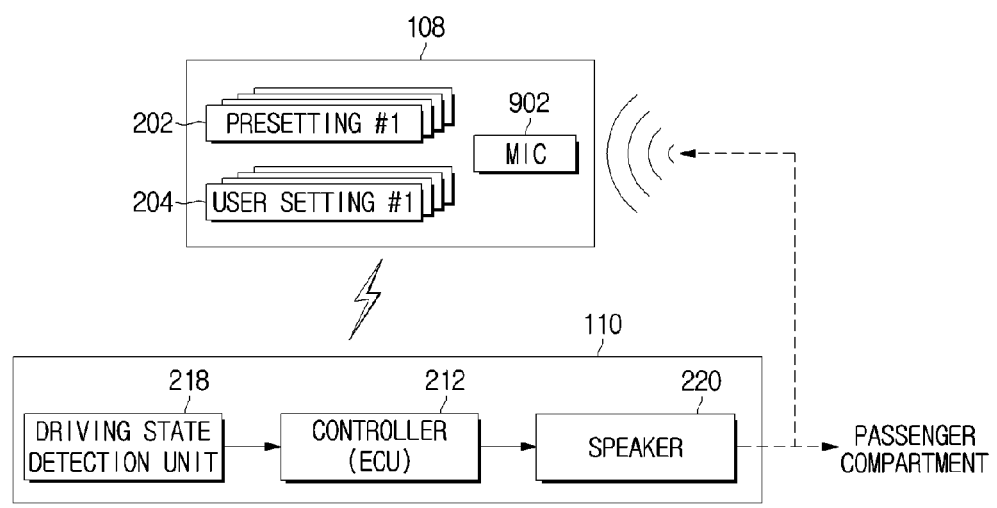
FIG. 8 is a diagram illustrating a control system of a vehicle driving sound control apparatus according to another exemplary embodiment of the present invention.

FIG. 8 is a diagram illustrating a control system of a vehicle driving sound control apparatus according to another exemplary embodiment of the present invention. As illustrated in FIG. 8, there are at least two methods, including presetting 202 and user setting 204, to allow the user to set a desired vehicle driving sound parameter through an application installed in the mobile terminal 108 so as to set a vehicle driving sound parameter. For this, the application of the mobile terminal 108 provides a user interface (for example, a graphic user interface) for enabling a desired vehicle driving sound parameter to be set through at least the two methods of the presetting 202 and the user setting 204.

The presetting 202 is presetting of a specific type of vehicle driving sound parameter by a manufacturer of the vehicle 100. The user 106 may cause the vehicle driving sound satisfying the vehicle driving sound parameter of the presetting 202 to be generated by merely selecting the desired presetting 202 through the application of the mobile terminal 108.

The user setting 204 enables the user to directly set at least one vehicle driving sound parameter to a desired value. The user 106 sets at least one vehicle driving sound parameter to the desired value through the application of the mobile terminal 108, thereby causing a type of vehicle driving sound desired by the user 106 to be generated.

When the user 106 generates a desired type of vehicle driving sound, it is necessary to attenuate an engine sound which is a basic driving sound if a level of a type of vehicle driving sound (additional driving sound) desired by the user 106 is lower than a level of the engine sound (basic driving sound) basically generated in the engine 102. For this, after information of a sound to be actually transferred to the passenger compartment 104 is acquired and compared to a level of a desired vehicle driving sound, it is necessary to attenuate the sound by a necessary amount. At this time, a microphone is necessary as a sound acquisition means for acquiring the level of the sound to be actually transferred to the passenger compartment 104.

In the vehicle driving sound control apparatus according to still another embodiment of the present invention illustrated in FIG. 8, as an apparatus for acquiring sound information within the passenger compartment 104, a microphone 902 provided in the mobile terminal 108 is used without a separate microphone being installed. In this case, cost reduction may be implemented because it is not necessary to install another separate microphone.

When a type of vehicle driving sound parameter desired by the user 106 is set through the presetting 202 or the user setting 204 in the mobile terminal 108, the mobile terminal 108 transmits the set vehicle driving sound parameter to the controller 212 of the vehicle driving sound control apparatus 110 through communication. The controller 212, for example, an electronic controller (ECU), controls an overall operation of each system of the vehicle 100 by communicating with a suspension system, a transmission system, a fuel supply system, a steering system, a braking system, a power supply system, an exhaust system, a cooling system, and the like of the vehicle 100. For example, the controller 212 is the ECU associated with control of the engine 102, and a plurality of ECUs separately provided for each system of the vehicle 100 described above are provided. It is possible to control the overall operation necessary for driving the vehicle 100 though organic action while the controller 212 and other ECUs perform mutual communication.

In the exemplary embodiment of the present invention, the controller 212 receives the vehicle driving sound parameter transmitted from the mobile terminal 108, generates a signal corresponding to the vehicle driving sound while reflecting the received vehicle driving sound parameter, and drives the speaker 220 after the signal is amplified, thereby causing the vehicle driving sound to be transferred to the inside of the passenger compartment 104.

When the user 106 sets the vehicle driving sound parameter through the application of the mobile terminal 108, the controller 212 drives the speaker 220 while reflecting the set vehicle driving sound parameter. At this time, a type of vehicle driving sound suitable for an operation state of the vehicle 100 is configured to be generated simultaneously while the vehicle driving sound parameter set by the user 106 is satisfied by determining the driving state (or driving condition) of the vehicle 100 through the driving state detection unit 218 and controlling a driving degree of the speaker 220 in consideration of the driving state of the vehicle 100. The driving state detection unit 218 includes a plurality of sensors for detecting operation states of various constituent elements of the vehicle 100 at various positions of the vehicle 100. Operation state information of various constituent elements of the vehicle 100 detected by the plurality of sensors of the driving state detection unit 218 is transmitted to the controller 212. The controller 212 determines a driving state (or driving condition) of the vehicle 100 through the operation state information.

In the above-described exemplary embodiment, a vehicle driving sound desired by the driver 106 is generated by adding an additional driving sound to a basic driving sound (engine sound). Here, the basic driving sound is a sound generated when the engine 102 is driven and it is very difficult to change the basic driving sound itself generated from the engine 102. However, it is possible to arbitrarily change the basic driving sound (engine sound) to be heard by the driver 106 within the passenger compartment 104 by offsetting and removing a signal of a specific order frequency of the basic driving sound (engine sound) in vehicle driving sound control according to another exemplary embodiment of the present invention. It is possible to generate more various types of driving sounds when the basic driving sound (engine sound) may be changed compared to when the basic driving sound is fixed. For example, the basic driving sound of a 4-cylinder engine is not changed even when an additional driving sound is added in a state in which an engine sound of a 4-cylinder engine is fixed. However, because a basic driving sound of an engine other than a 4-cylinder engine may be implemented when a signal of a specific order frequency of the engine sound is offset and removed, for example, in the case of the 4-cylinder engine, as in another exemplary embodiment of the present invention, it is possible to generate more various types of basic driving sounds (engine sounds). The other exemplary embodiment of the present invention will be described with reference to FIGS. 9A and 9B and 10 as follows.

Figure 9A:
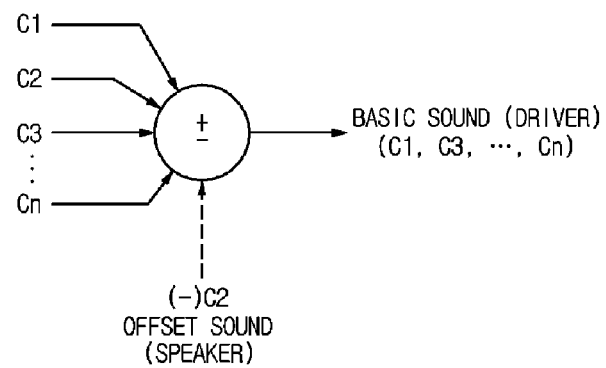
FIGS. 9A and 9B are diagrams illustrating a concept of vehicle driving sound control according to another exemplary embodiment of the present invention.
Figure 9B:
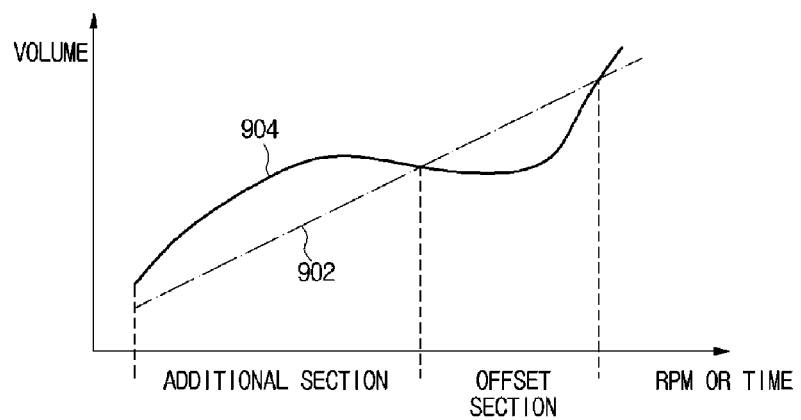

FIGS. 9A and 9B are diagrams illustrating a concept of vehicle driving sound control according to another exemplary embodiment of the present invention. The case in which the level of the vehicle driving sound may be increased or decreased in a corresponding order using the plurality of slide bars 524 capable of separately adjusting each order-specific level of the engine sound has been described above with reference to FIG. 5B. By applying this, it is possible to change the fixed basic driving sound of the engine 102 to a variable basic driving sound by offsetting and removing a signal of a specific order frequency of the engine sound.

In FIG. 9A, a basic driving sound constituted of C1, C2, C3, . . . , Cn is a sound which is generated from the engine 102 and transferred to the passenger compartment 104 (see FIG. 1). When a basic driving sound constituted of C1, C2, C3, . . . , Cn(+) is transferred to the passenger compartment 104, a signal of a C2 order frequency of the basic driving sound transferred to the passenger compartment 104 is offset and removed by an offset sound ((−)C2) if the offset sound ((−)C2) for offsetting and removing the signal (for example, C2) of the specific order frequency set by the driver 102 is output to the passenger compartment 104 through the speaker 220 (see FIG. 7). In this case, the basic driving sound to be heard by the driver 102 within the passenger compartment 104 becomes a basic driving sound constituted of constituted of C1, C3, . . . , Cn(+) from which the signal of the C2 order frequency is removed. Here, the vehicle driving sound desired by the driver 106 is combined with an additional driving sound generated by the vehicle driving sound control apparatus 110 and the vehicle driving sound desired by the driver 106 is provided to the inside of the passenger compartment 104.

FIG. 9B is a diagram illustrating the case in which the volume of an actual engine sound does not match the volume of a target sound desired to be implemented. As illustrated in FIG. 9B, when a basic sound 902 actually generated from the engine 102 does not match a target sound 904 desired to be implemented, an addition section in which the additional sound is added to the basic sound 902 and an offset section in which the basic sound 902 is partially offset occur. In the addition section, a difference between the basic sound 902 and the target sound 904 is further added to the volume. In the offset section, the volume is offset by the difference between the basic sound 902 and the target sound 904 using the method described above with reference to FIG. 9A. Because the target sound 904 is implemented only in the section in which the target sound 904 is larger than the basic sound 902 and the target sound 904 may not be fully implemented in a section in which the target sound 904 is less than the basic sound 902 if the volume offset process is not performed in the offset section, the offset of the volume is very important as in the offset section of FIG. 9B.

Figure 10:
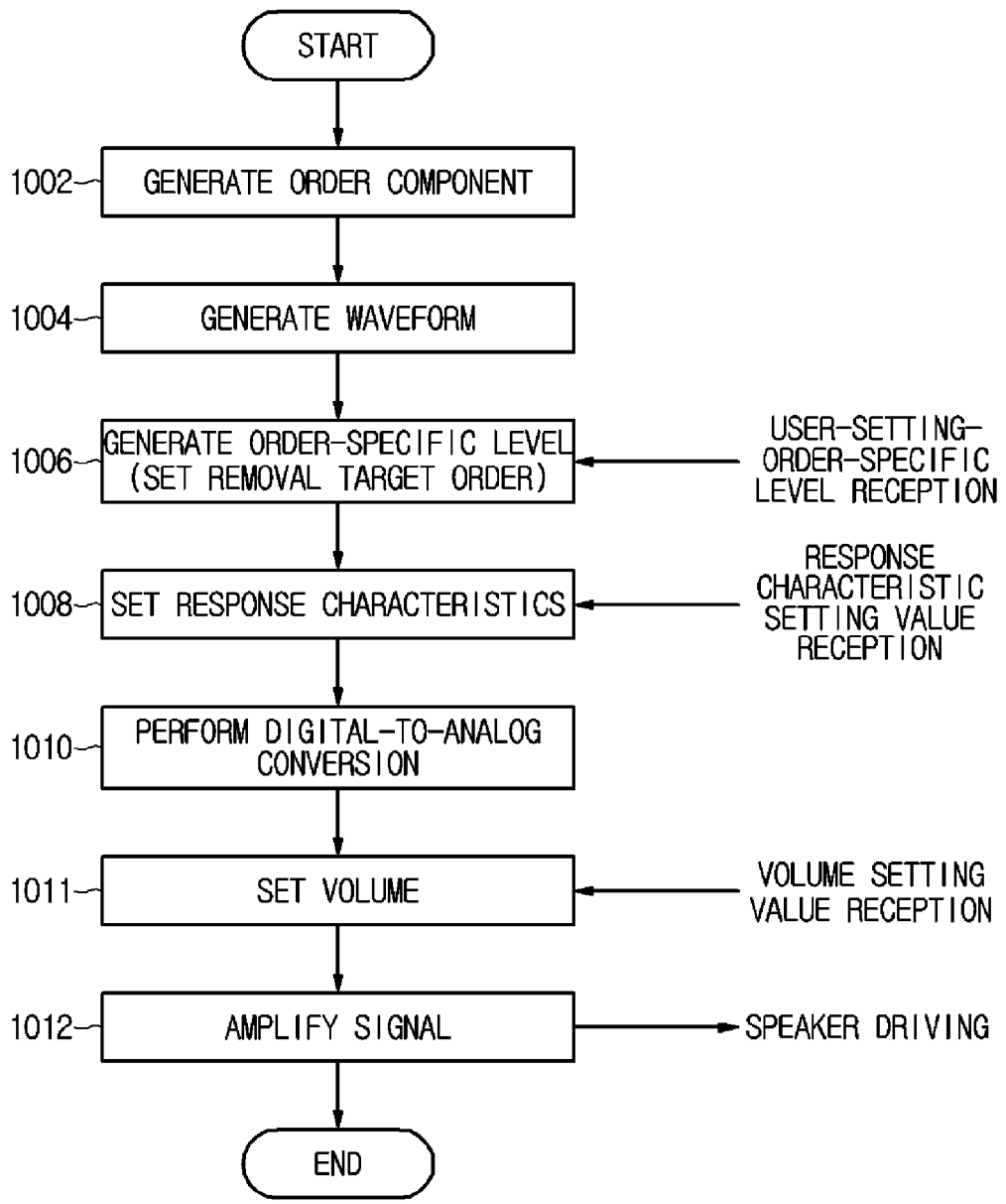
FIG. 10 is a diagram illustrating a vehicle driving sound control method according to another exemplary embodiment of the present invention.

FIG. 10 is a diagram illustrating a vehicle driving sound control method according to another exemplary embodiment of the present invention. As illustrated in FIG. 10, the controller 212 generates a control signal for generating the vehicle driving sound through a series of processes such as <order component generation 1002>, <waveform generation 1004>, <order-specific level generation 1006>, <response characteristic setting 1008>, <digital-to-analog conversion 1010>, <volume setting 1011>, <signal amplification 1012>, and the like.

In the step of <order component generation 1002>, order components of harmonic signals of various orders are generated according to the RPM of the engine 102. In the step of <waveform generation 1004>, a current waveform of an order-target-value-specific output signal is generated in consideration of a vehicle transfer function, an order target value according to the vehicle transfer function, and the like. In the step of <order-specific level generation 1006>, an order-specific level value is generated by applying the order-specific level profile previously set by the user in FIG. 5B. When the user sets the order-specific level profile, it is possible to offset and remove the signal of a corresponding order frequency in the basic driving sound (engine sound) output to the passenger compartment 104 by setting the setting value of the signal of the specific order frequency as described with reference to FIG. 9 to a (−) maximum value. In the step of <response characteristic setting 1008>, a gain of the vehicle driving sound is determined by applying the response characteristics previously set by the user in FIG. 5C. In the step of <digital-to-analog conversion 1010>, digital-to-analog conversion for converting a digital control value generated in steps 1002 to 1008 in the form of an analog signal for actually driving the speaker 220 is performed. In the step of <volume setting 1011>, a volume (that is, a magnitude of sound while the vehicle is being driven) is determined according to the user settings of <master volume>, <torque-adjusted volume>, and <speed-adjusted volume> as described above with reference to FIG. 5A. In this manner, because a signal converted in the analog form is not sufficiently large to drive the speaker 220, the speaker 220 is driven by amplifying the signal through <signal amplification 1012>. In the step of <signal amplification 1012>, a volume setting value determined in the step of <volume setting 1011> is reflected.

Figure 11A:
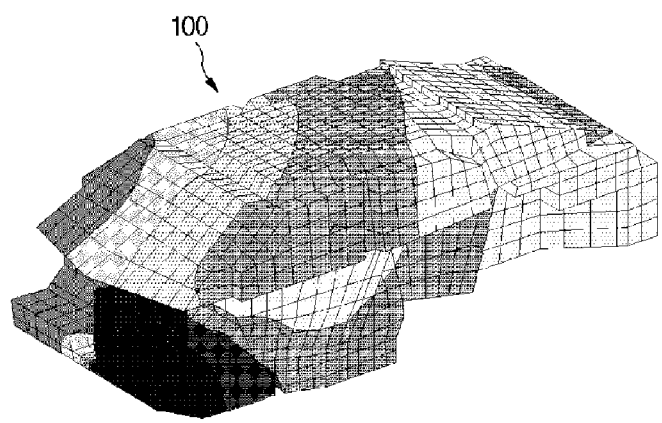
FIGS. 11A to 11C are diagrams illustrating a vehicle driving sound control method according to another exemplary embodiment of the present invention.
Figure 11B:
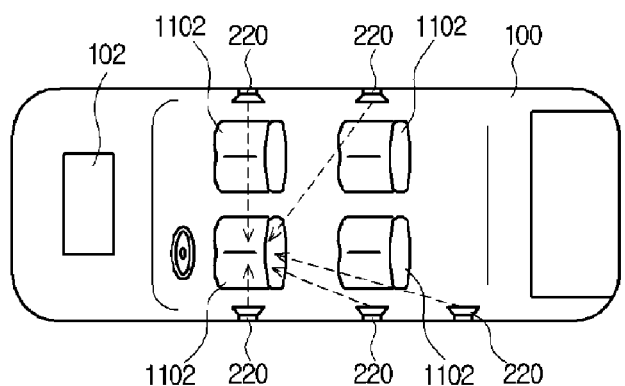
Figure 11C:
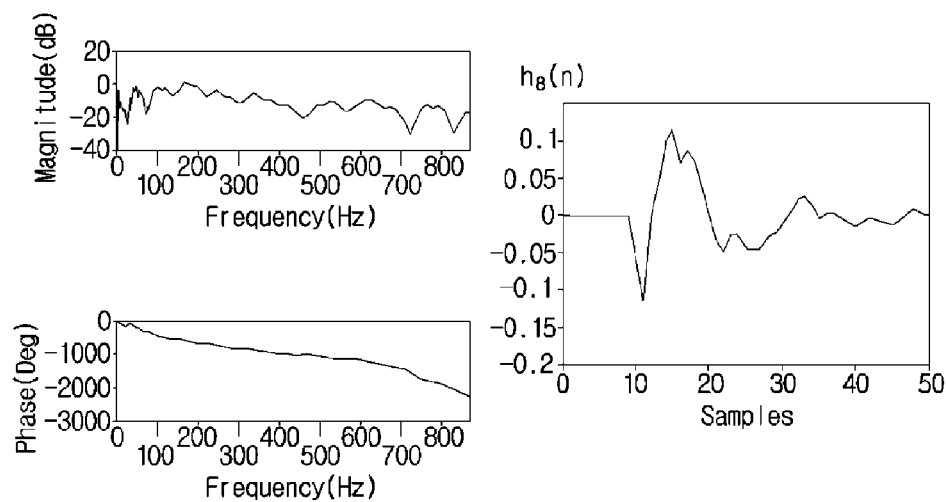

FIGS. 11A to 11C are diagrams illustrating a vehicle driving sound control method according to another exemplary embodiment of the present invention. FIG. 11A is a diagram illustrating frequency characteristics of an internal space of the vehicle 100. As illustrated in FIG. 11A, a distribution of a driving sound is shown to differ for every frequency according to a position of an internal space of the vehicle 100 in the internal space. Accordingly, the quality of a driving sound may be degraded if frequency characteristics of the driving sound for each position of the internal space of the vehicle 100 are not considered.

In addition, as illustrated in FIG. 11B, times until a sound signal output from each of the plurality of speakers 220 is transferred to seats are also different from each other because distances from each of the plurality of speakers 220 for outputting the driving sound to the inside of the vehicle 100 to seats are different from each other. For example, because a sound signal of the speaker closest to the driver seat is transferred to the driver first and a sound signal of the speaker farthest from the driver seat is transferred to the driver last when sound signals are simultaneously output from the plurality of speakers 220, the driving sound for the driver on the driver seat may sound disharmonious rather than as one complete driving sound. In order to solve this problem, a microphone 1102 is installed at each seat position, and a time until the sound signal output from the speaker 220 is actually transferred to each seat position may be measured.

In addition, sound transfer characteristics of the vehicle 100 until the engine sound generated from the engine 102 and the sound signal output from the speaker 220 are transferred to the passenger inside the vehicle 100 may differ according to each vehicle model. Accordingly, in order to faithfully implement a desired driving sound, the engine sound and the driving sound are required to be transferred to the inside of the passenger compartment 104 by sufficiently considering the sound transfer characteristics of the vehicle 100.

For this, in the vehicle driving sound control method according to another exemplary embodiment of the present invention, a driving sound having higher quality may be configured to be provided by generating the driving sound of the vehicle 100 reflecting a frequency-specific sound distribution of the internal space of the vehicle 100, a sound arrival time from the speaker 220 to the seat (in particular, the driver seat), and sound transfer characteristics unique to the vehicle 100.

FIG. 12 is a diagram illustrating a vehicle driving sound control method according to another exemplary embodiment of the present invention. As illustrated in FIG. 12, the controller 212 reflects a frequency-specific sound distribution of the internal space when the driving sound of the vehicle 100 is generated (1202). It is possible to generate a driving sound with uniform quality by differentiating driving sounds output from the plurality of speakers 220 in consideration of the frequency-specific sound distribution according to each position in the internal space of the vehicle 100.

In addition, the controller 212 generates the driving sound in consideration of a sound arrival time from the speaker 220 to the seat (in particular, the driver seat) (1204). For example, operations of the plurality of speakers 220 are differentiated so that sound signals output from the plurality of speakers 220 simultaneously reach the driver seat by causing the speaker farthest from the driver seat to output the sound signal first and causing the speaker closest to the driver seat to output the sound signal last. Consequently, a high-quality driving sound may be configured to be output from the speaker 220.

In addition, the controller 212 generates a driving sound while reflecting the sound transfer characteristics unique to the vehicle 100 (1206). It is possible to implement a faithful driving sound for the unique sound transfer characteristics of the vehicle 100 by generating a driving sound in consideration of the unique sound transfer characteristics of the vehicle 100 until the engine sound generated from the engine 102 and the sound signal output from the speaker 220 are transferred to a passenger inside the vehicle 100.

In this manner, a high-quality driving sound may be provided to the driver 106 by outputting a generated driving sound of the vehicle 100 reflecting a frequency-specific sound distribution of the internal space of the vehicle 100, a sound arrival time from the speaker 220 to the seat (in particular, the driver seat), and unique sound transfer characteristics of the vehicle 100 through the plurality of speakers 220.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle comprising:
    a setting unit configured to set response characteristics of a vehicle driving sound for at least one of a plurality of pieces of vehicle state information and set a section-specific volume of the vehicle driving sound for at least one of a plurality of set response characteristics including revolutions per minute (RPM); and
    a controller configured to control an output of the vehicle driving sound generated according to a setting of the setting unit and control characteristics of a sound-specific frequency distribution of an internal space of the vehicle to be reflected when the vehicle driving sound is generated and output.

2. The vehicle according to claim 1, wherein the plurality of pieces of vehicle state information include at least one of accelerator pedal sensitivity, torque, a speed, and a transmission gear stage of the vehicle.

3. The vehicle according to claim 1, wherein the setting of the section-specific volume of the vehicle driving sound includes setting a volume of a target driving sound through adding and offsetting for an actual engine sound according to each section.

4. The vehicle according to claim 1, wherein the characteristics are characteristics of a driving sound transfer time according to a plurality of positions within a boarding space and a relative position of a speaker from which the vehicle driving sound is output.

5. The vehicle according to claim 1, wherein the characteristics are synchronization characteristics of an output timing of each of a plurality of speakers from which the vehicle driving sound is output.

6. The vehicle according to claim 1, wherein the setting unit is at least one of a head unit and a mobile terminal.

7. A control method of a vehicle comprising:
    setting response characteristics of a vehicle driving sound for at least one of a plurality of pieces of vehicle state information;
    setting a section-specific volume of the vehicle driving sound for at least one of a plurality of set response characteristics including revolutions per minute (RPM); and
    controlling an output of the vehicle driving sound generated according to the setting of a setting unit and controlling characteristics of a sound-specific frequency distribution of an internal space of the vehicle to be reflected when the vehicle driving sound is generated and output.

8. The control method of the vehicle according to claim 7, wherein the plurality of pieces of vehicle state information include at least one of accelerator pedal sensitivity, torque, a speed, and a transmission gear stage.

9. The control method of the vehicle according to claim 7, wherein the setting of the section-specific volume of the vehicle driving sound includes setting a volume of a target driving sound through adding and offsetting for an actual engine sound according to each section.

10. The control method of the vehicle according to claim 7, wherein the characteristics are characteristics of a driving sound transfer time according to a plurality of positions within a boarding space and a relative position of a speaker from which the vehicle driving sound is output.

11. The control method of the vehicle according to claim 7, wherein the characteristics are synchronization characteristics of an output timing of each of a plurality of speakers from which the vehicle driving sound is output.

12. The control method of the vehicle according to claim 7, wherein the setting unit is at least one of a head unit and a mobile terminal.

13. A vehicle driving sound control apparatus comprising:
    a setting unit configured to set response characteristics of a vehicle driving sound for at least one of a plurality of pieces of vehicle state information and set a section-specific volume of the vehicle driving sound for at least one of a plurality of set response characteristics including RPM; and
    a controller configured to control an output of the vehicle driving sound generated according to a setting of the setting unit and control characteristics of a sound-specific frequency distribution of an internal space of the vehicle to be reflected when the vehicle driving sound is generated and output.

14. A vehicle comprising:
    a setting unit configured to set response characteristics of a vehicle driving sound for at least one of a plurality of pieces of vehicle state information including accelerator pedal sensitivity, torque, a speed, and a transmission gear stage of the vehicle and set a section-specific volume of the vehicle driving sound for at least one of a plurality of set response characteristics including RPM; and
    a controller configured to control an output of the vehicle driving sound generated according to a setting of the setting unit and control characteristics of a sound-specific frequency distribution of an internal space of the vehicle to be reflected when the vehicle driving sound is generated and output.

* * * * *